US008018998B2

(12) United States Patent
Li et al.

(10) Patent No.: US 8,018,998 B2
(45) Date of Patent: Sep. 13, 2011

(54) LOW COMPLEXITY MOTION COMPENSATED FRAME INTERPOLATION METHOD

(75) Inventors: Jiang Li, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1818 days.

(21) Appl. No.: 11/133,674

(22) Filed: May 20, 2005

(65) Prior Publication Data
US 2006/0262853 A1    Nov. 23, 2006

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.16

(58) Field of Classification Search ........................ None
See application file for complete search history.

(56) References Cited

U.S. PATENT DOCUMENTS

| 6,618,439 | B1 * | 9/2003 | Kuo et al. | 375/240.16 |
| 2002/0036705 | A1 * | 3/2002 | Lee et al. | 348/459 |
| 2003/0103568 | A1 * | 6/2003 | Lee et al. | 375/240.16 |
| 2005/0232357 | A1 * | 10/2005 | Hubrich et al. | 375/240.16 |
| 2006/0215761 | A1 * | 9/2006 | Shi et al. | 375/240.16 |

OTHER PUBLICATIONS

Chen, T., "Adaptive temporal interpolation using bidirectional motion estimation and compensation", IEEE ICIP, 2002, pp. 313-316.

Hilman, K., Park, H., and Kim, Y., "Using Motion-Compensated Frame-Rate Conversion for the Correction of 3:2 Pulldown Artifacts in Video Sequences," IEEE Transactions on CSVT, Sep. 2000, pp. 869-877, vol. 10, No. 6.

Al-Mualla, M.E.,"Motion field interpolation for frame rate conversion", ISCAS 2003, pp. II-652-II-655.

Choi, B., Lee, S., and Ko, S., "New frame rate up-conversion using bi-directional motion estimation," IEEE Trans. on Consumer Electronics, Aug. 2000, pp. 603-609, vol. 46, No. 3.

Dane, G., Nguyen, T., "Motion vector processing for frame rate up conversion", IEEE ICASSP 2004, pp. III-309-III-312.

Lam, W.M., Reibman, A.R.; Liu, B., "Recovery of lost or erroneously received motion vectors", IEEE ICASSP 1993, pp. V-417-V-420.

Tang, C.W. and Au, O.C., "Comparison between block-based and pixel-based temporal interpolation for video coding", ISCAS 1998, pp. IV-122-IV125.

Astola, J., Haavisto, P.; Neuvo, Y.,"Vector median filters", Proceedings of the IEEE, Apr. 1990, pp. 678-689, vol. 78, No. 4.

* cited by examiner

*Primary Examiner* — Nhon T Diep
(74) *Attorney, Agent, or Firm* — Lee & Hayes, PLLC (57) ABSTRACT

Video decoding that employs motion compensated frame interpolation (MCFI) is described. The MCFI technique minimizes computations by limiting motion estimation to blocks having motion vectors that do not represent true motion. The MCFI determines these blocks using a sum of absolute differences (SAD) and a boundary absolute difference (BAD) between a current block and a previous block. The current block and previous block are obtained based on a selected interpolated block and an embedded motion vector for a block within the current frame having the same position as the selected interpolated block. If the SAD and BAD measurements do not meet certain thresholds, the embedded motion vector is classified as not representing true motion. Overlapped block bi-directional motion estimation is then performed to obtain a new motion vector. Overlapped block motion compensation is employed to generate the interpolated frame. Vector smoothing may be performed before generating the interpolated frame.

17 Claims, 10 Drawing Sheets

LOW COMPLEXITY MOTION COMPENSATED FRAME INTERPOLATION METHOD

TECHNICAL FIELD

This disclosure relates to video decoding, and particularly, to video decoding that uses motion compensated frame interpolation.

BACKGROUND

Real-time video has become increasingly popular to users. However, when there is limited bandwidth available for the real-time video, some type of compression needs to be performed in order to reduce the amount of data that is transmitted on the limited bandwidth. One type of compression involves temporal sub-sampling. Temporal sub-sampling reduces the amount of data by skipping specific frames, such as skipping one frame in every two frames. When a decoder receives a bitstream encoded using temporal sub-sampling, the decoder is responsible for recovering (i.e., interpolating) the skipped frames in order to restore the original frame rate.

There are various approaches for interpolating the skipped frames. One approach, commonly called frame repetition, repeats each frame that is sent. The repeated frame then fills in the time slot for the skipped frame. However, frame repetition introduces jerky artifacts quite noticeable to the users. Another approach, commonly called frame averaging, averages a pixel from a previous frame and a current frame to obtain a corresponding pixel for the interpolated frame. However, frame averaging introduces blurry artifacts because it does not consider motion.

Recently, another approach has gained increasing popularity. This approach, commonly called motion compensated frame interpolation (MCFI), considers motion during its interpolation. Motion compensated frame interpolation performs motion estimation on the previous frame and the current frame to obtain a motion vector. The motion compensated frame interpolation shifts the corresponding pixels of the previous frame and the current frame by half of the obtained motion vector along opposite directions and then interpolates the skipped frame by averaging the shifted pixels in the previous frame and the current frame. Because motion compensated frame interpolation uses motion vectors to recover skipped frames, there has been considerable research efforts directed at improving the accuracy of estimating motion vectors.

Even with these advances, there is still a need for improved interpolation techniques that result in higher quality frame interpolation with minimal computing complexity.

SUMMARY

Video decoding that employs motion compensated frame interpolation (MCFI) is described. The MCFI technique minimizes computations by limiting motion estimation to blocks having motion vectors that do not represent true motion. The MCFI determines these blocks using a sum of absolute differences (SAD) and a boundary absolute difference (BAD) between a current block and a previous block. The current block and previous block are obtained based on a selected interpolated block and an embedded motion vector for a block within the current frame having the same position as the selected interpolated block. If the SAD and BAD measurements do not meet certain thresholds, the embedded motion vector is classified as not representing true motion. Overlapped block bi-directional motion estimation is then performed to obtain a new motion vector. Overlapped block motion compensation is employed to generate the interpolated frame. Vector smoothing may be performed before generating the interpolated frame.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to video decoding techniques that employ motion compensated frame interpolation (MCFI) techniques. The present motion compensated frame interpolation technique minimizes the computation complexity for estimating motion vectors by limiting the number of blocks that undergo motion estimation. It does this by examining the motion vectors embedded in the bitstream and determining which blocks (referred to as bad blocks) have embedded motion vectors that do not meet an accuracy criteria. The bad blocks then undergo motion estimation, rather than having all of the blocks undergo motion estimation. New motion vectors are assigned to these bad blocks, which reduce artifacts during frame interpolation. In addition, the present low complexity motion compensated frame interpolation technique utilizes motion vector post-processing and overlapped block motion compensation during the interpolation of frames. This further reduces the artifacts. These and other advantages will become clear after reading the following detailed description.

The following description first describes an exemplary system architecture for encoding/decoding video data. Next, the description explains exemplary implementations of a low complexity motion compensated frame interpolation process.

Exemplary System Architecture

Figure 1:
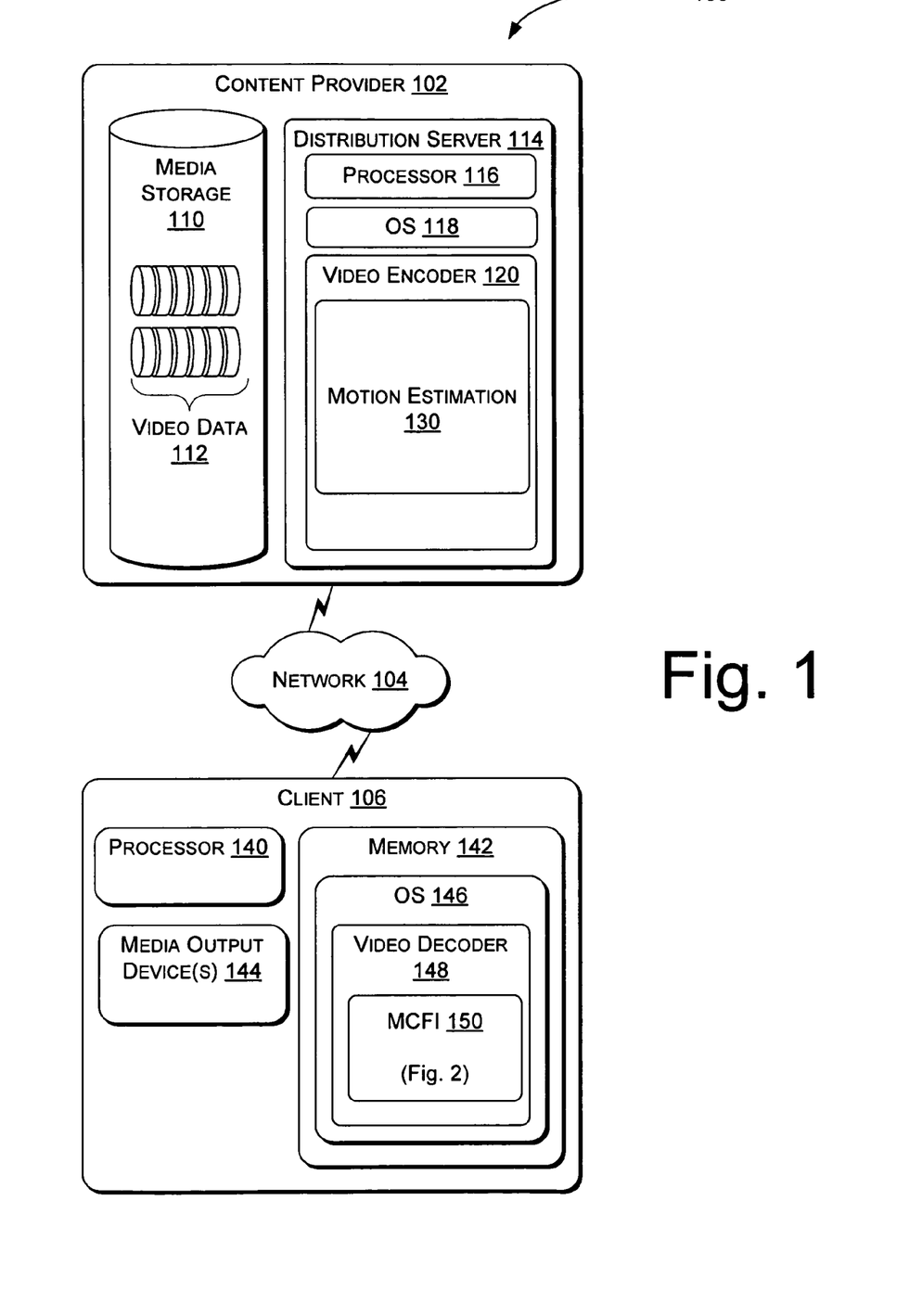
FIG. 1 illustrates an exemplary media distribution system in which a video decoder using the present low complexity motion compensated frame interpolation method may be implemented.

FIG. 1 illustrates an exemplary media distribution system 100 in which a video coder using block-based motion estimation may be implemented and a video decoder using motion compensated frame interpolation may be implemented. The media distribution system 100 includes a content producer/provider 102 that produces and/or distributes media content over a network 104 to a client 106. The network is representative of many different types of networks, including the Internet, a local area network (LAN), a wide area network (WAN), a storage area network (SAN), cable network, and wireless networks (e.g., satellite, cellular, RF, etc.).

The content producer/provider 102 may be implemented in numerous ways, such as a mobile device configured to store, process, and distribute media content. The content producer/provider 102 has media storage 110 to store digital content, including video data 112. Alternatively, the video content may be captured real-time. The content producer/provider 102 also has a distribution server 114 to encode the media and distribute it over the network 104. The server 114 has a processor 116, an operating system 118, and a video encoder 120. The video encoder 120 may be implemented in software, firmware, and/or hardware. The encoder 120 is shown as a separate standalone module for discussion purposes, but may be constructed as part of the processor 116 or incorporated into operating system 118 or other applications (not shown).

The video encoder 120 encodes the video data 112 using a block-based motion estimation coding scheme 130. Motion estimation coding scheme refers to a scheme which identifies blocks that are moving from frame to frame. For each of these moving blocks, a motion vector is obtained that describes the block's movement from its previous frame to its current frame. The motion vector is two dimensional, with (x, y) coordinates, and describes a shift length and a direction. Shift length defines how much the block has moved from the previous frame, and the direction indicates in which direction the block has moved.

The client 106 is equipped with a processor 140, a memory 142, and one or more media output devices 144. The memory 142 stores an operating system 146 that executes on the processor 140. The operating system 146 implements a client-side video decoder 148 to decode the video. Decoder 148 is configured to implement a motion compensated frame interpolation (MCFI) technique 150. Briefly, described in detail in conjunction with FIG. 2, MCFI 150 evaluates the embedded motion vectors generated by video encoder 120 and transmitted in the bitstream to the client 106. This evaluation classifies the motion vectors as accurate or inaccurate. Blocks associated with motion vectors classified as inaccurate undergo motion estimation in decoder 148. As will be described in FIG. 2, additional processing is performed to further reduce artifacts. Following decoding, the client stores the video in memory and/or plays the video via the media output devices 144. The client 106 may be embodied in many different ways, including as a mobile device, a computer, an entertainment device, a set-top box, a television, one or more application specific integrated circuits (ASIC), and so forth.

In one illustrative example, content provider 102 and client 106 may both be mobile devices engaged in a real-time video communication session over a wireless network. For this example, content provider 102 and client would each have the video encoder 120 and video decoder 148.

Low Complexity Motion Compensated Frame Interpolation

Figure 2:
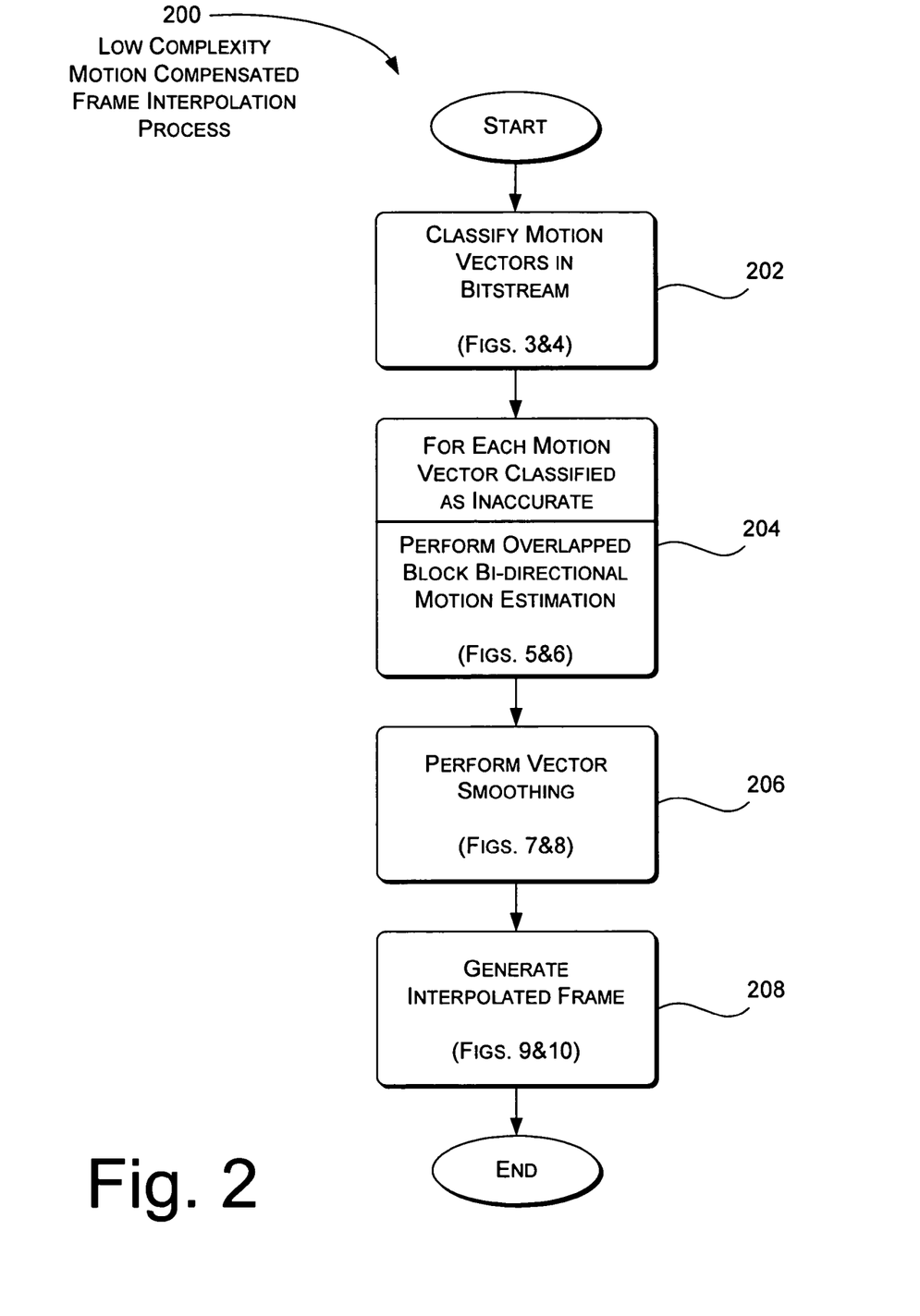
FIG. 2 is a flow diagram illustrating one implementation of a low complexity motion compensated frame interpolation method suitable for use in the video decoder shown in FIG. 1.

FIG. 2 is a flow diagram illustrating one implementation of a low complexity motion compensated frame interpolation process 200 suitable for use in the video decoder shown in FIG. 1. Process 200 begins at block 202, where motion vectors embedded in a bitstream are classified. As will be described, the present low complexity MCFI technique recognizes that classifying already embedded motion vectors can significantly reduce the complexity in performing motion estimation. As mentioned above, the embedded motion vectors are calculated in the video encoder (FIG. 1) using a block-based motion estimation technique. Briefly, described in detail in conjunction with FIG. 3, the classification of the motion vectors into accurate and inaccurate motion vectors is based on two measurements: the sum of absolute differences (SAD) and the boundary absolute difference (BAD). Processing continues at block 204.

At block 204, overlapped block bi-directional motion estimation is performed on each block having a motion vector classified as inaccurate. Briefly, described in detail in conjunction with FIGS. 5 and 6, the overlapped block bi-directional motion estimation provides a favorable tradeoff between accuracy and complexity. In addition, because only the blocks having a motion vector classified as inaccurate undergo motion estimation, the computation complexity of employing motion compensated frame interpolation is greatly reduced. Processing continues at block 206.

At block 206, vector smoothing is performed. Even after evaluating the motion vectors and classifying them as accurate or inaccurate, it was recognized that a few inaccurate motion vectors still existed. These inaccurate motion vectors brought annoying artifacts and degraded video quality. It was determined that most of the artifacts originated from discontinuities in a motion field. Briefly, described in detail in conjunction with FIGS. 7 and 8, vector smoothing identifies motion vectors that break the continuity of the motion field and assigns a more suitable motion vector to the associated block. Processing continues at block 208.

At block 208, interpolated frames are generated. Briefly, described in detail in conjunction with FIGS. 9 and 10, the newly assigned motion vectors are used during the interpolation process. In addition, the interpolation process takes into account neighboring motion vectors when interpolating frames. Processing for the present low complexity motion compensated frame interpolation process is then complete.

The processing in blocks 202-208 may be performed real-time or offline, if desired. When processing is performed real-time, one block may be in the process of performing one of blocks 202-208 while another block may be in the process of also performing one of the blocks 202-208.

Figure 3:
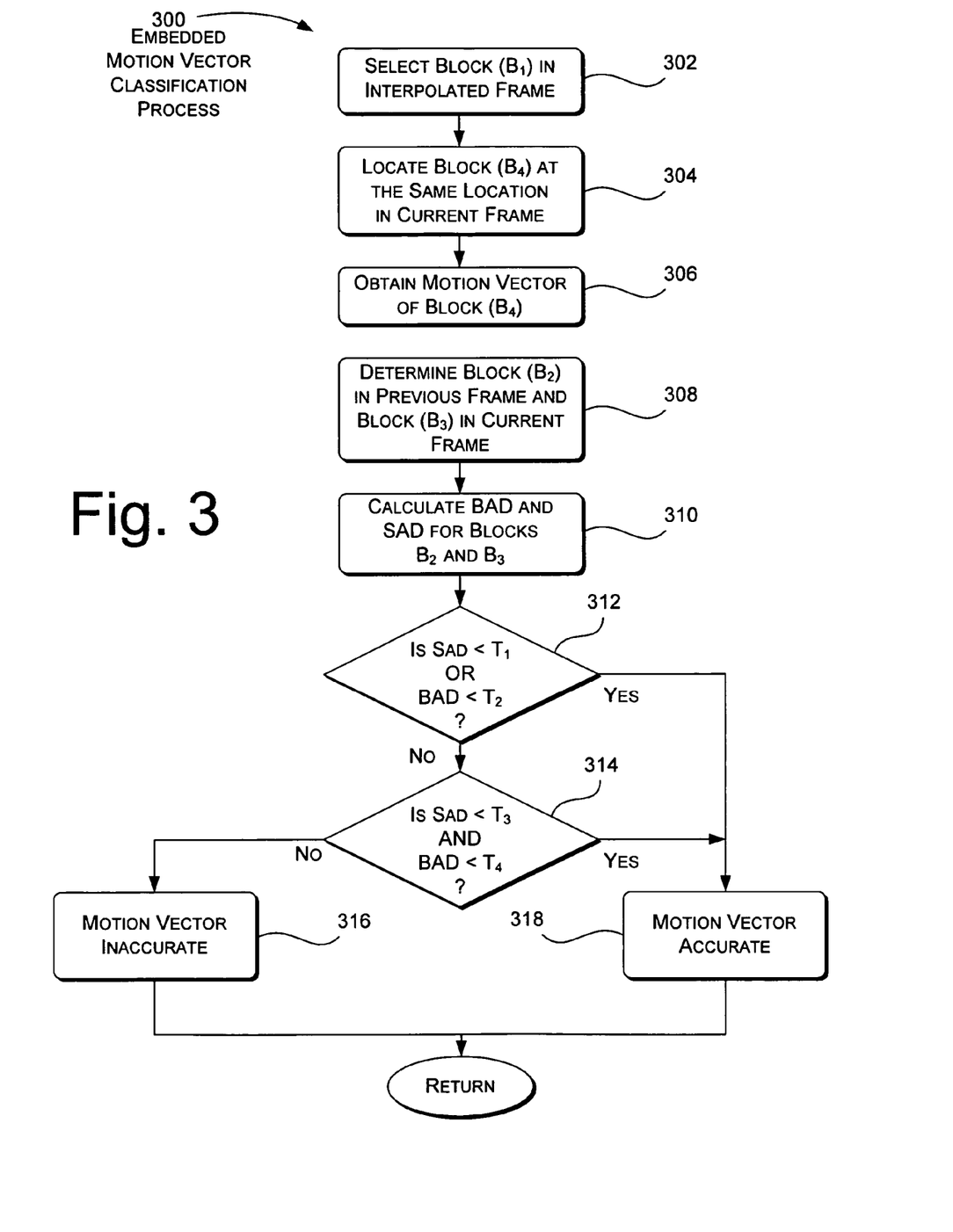
FIG. 3 is a flow diagram illustrating one implementation of an embedded motion vector classification process suitable for use in the low complexity MCFI process illustrated in FIG. 2.
Figure 4:
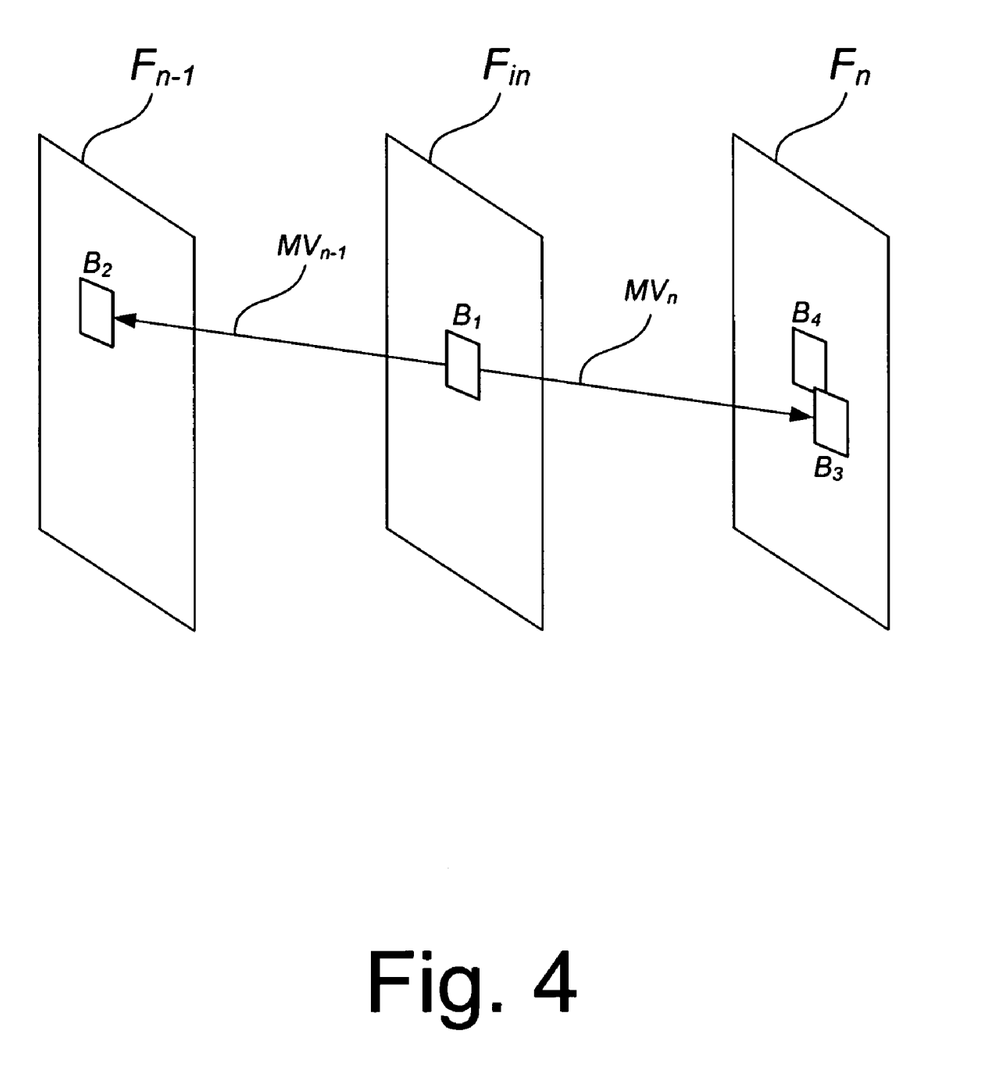
FIG. 4 is a graphical representation of three frames used in conjunction with FIG. 3 for describing the embedded motion vector classification process.

FIG. 3 is a flow diagram illustrating one implementation of an embedded motion vector classification process 300 suitable for use in the present low complexity MCFI process illustrated in FIG. 2. FIG. 4 is a graphical representation of three frames that will be used in conjunction with FIG. 3 to describe process 300. Before describing process 300, the insights that prompted the development of process 300 are described. A first insight was that using embedded motion vectors instead of calculating the motion vector for each block could significantly reduce the complexity of MCFI. However, using embedded motion vectors introduced some artifacts in the interpolated frame if the embedded motion vector did not represent true motion. A second insight was that the embedded motion vectors could be classified as ones that represent true motion (i.e., accurate motion vectors) and ones that did not represent true motion (i.e., inaccurate motion vectors). Then, only the blocks having inaccurate motion vectors needed to undergo motion estimation. However, given these insights, there was no known technique that would consistently and accurately classify motion vectors based on whether the motion vector represented true motion or not.

In the past, two well known techniques, sum of absolute differences (SAD) and boundary absolute difference (BAD), were used for different purposes. For example, the SAD was used in motion vector detection while BAD was used to measure the accuracy of motion compensation. Each technique had limitations. For example, SAD failed to point out true motion vectors if the difference between neighboring pixels was small (i.e., small local variation). SAD failed in this situation because there were too many locations that had a similar block (e.g., image with areas of the same color). SAD would quite often select one of the incorrect locations and use the incorrect location when determining the motion vector. In another example, BAD failed to accurately measure the accuracy of motion compensation if the image had a large local variation. BAD failed in this situation because every block seemed to have the same difference.

A third insight was the perception to combine two of the known techniques (SAD and BAD) in a manner that would consistently and accurately classify motion vectors as representing true motion or not representing true motion. In so doing, a relatively low complexity classification process was developed that significantly reduced the computation for performing motion compensated frame interpolation. The classification technique illustrated in FIG. 3 will now be described in conjunction with FIG. 4.

At block 302, a block ($B_1$) in an interpolated frame is selected. One will note that each block in the interpolated frame becomes selected during MCFI in order to correctly recover the corresponding skipped (i.e., missing) frame. Block ($B_1$) is chosen as an example. Turning briefly to FIG. 4, one can see the graphical representation of three frames: a current frame ($F_n$); a previous frame ($F_{n-1}$); and an interpolated frame ($F_{in}$). Block ($B_1$) is in the interpolated frame. Processing continues at block 304.

At block 304, a block ($B_4$) in the current frame is located at the same position as block ($B_1$) in the interpolated frame. Processing continues at block 306.

At block 306, the motion vector ($MV_{B4}$) of block ($B_4$) is obtained. As mentioned earlier, this motion vector is embedded in the bitstream. In one embodiment, each block is 8×8 pixels. Therefore, if the bitstream is encoded using another block size (e.g., 16×16 to 4×4), a motion vector for each 8×8 block is obtained by "splitting and merging" For block sizes larger than 8×8, each constituent 8×8 block has the same motion vector as that of the original block. For any 8×8 block that has been split into several sub-blocks, the motion vector of the 8×8 block is the average of the motion vectors of all its sub-blocks. In this manner, the present low complexity MCFI technique can be applied to a bitstream that is encoded by almost any video coding standard. Processing continues at block 308.

At block 308, a block ($B_2$) in the previous frame and a block ($B_3$) in the current frame are determined. These blocks are determined by following the trajectory pointed by the motion vector of block ($B_4$) from block ($B_1$). Motion vector ($MV_n$) represents the trajectory from block ($B_1$) to obtain block ($B_3$). Motion vector ($MV_{n-1}$) represents the trajectory from block ($B_1$) to obtain block ($B_2$). Each motion vector is half of motion vector $MV_{B4}$. Motion vector ($MV_n$) is negative and motion vector ($MV_{n-1}$) is positive. Processing continues at block 310.

At block 310, the sum of absolute differences (SAD) and the boundary absolute differences (BAD) is calculated for blocks $B_2$ and $B_3$ using well known techniques. Processing continues at decision block 312.

At decision block 312, a determination is made whether either SAD or BAD meets one of the two more restrictive conditions. If $MV_{B4}/2$ is close to the true motion of block $B_1$, the SAD between block $B_2$ and block $B_3$ is expected to be small. Likewise, the BAD between block $B_2$ and pixels surrounding block $B_3$ is expected to be small. If SAD is less than a threshold $T_1$ or BAD is less than a threshold $T_2$, processing continues to block 318. Otherwise, processing continues at decision block 314.

At decision block 314, a determination is made whether SAD and BAD both meet two less restrictive conditions. If SAD is less than a threshold $T_3$ and BAD is less than a threshold $T_4$, processing continues to block 318. Otherwise, processing continues at block 316.

At block 316, the motion vector is classified as inaccurate. Thus, as will be described, the blocks having motion vectors classified as inaccurate undergo motion estimation. Processing is then complete.

At block 318, the motion vector is classified as accurate. Because $MV_{B4}/2$ is close to the true motion of block $B_1$, the embedded motion vector may be used for block $B_1$ during interpolation. Thus, blocks having motion vectors classified as accurate do not need to undergo motion estimation. This reduces the number of motion estimation computations needed to be performed. Processing is then complete.

Thresholds $T_1$ and $T_3$ are thresholds for SAD, where $T_1$ is smaller than $T_3$. Thresholds $T_2$ and $T_4$ are thresholds for BAD, where $T_2$ is smaller than $T_4$. Exemplary values for thresholds $T_1$, $T_2$, $T_3$, and $T_4$ are 5, 2, 10, and 6, respectively.

The present low complexity motion compensated frame interpolation process was performed on several standard video sequences. Results are listed in Table 1 below. One will note that only a small fraction of the blocks needed to undergo motion estimation. Therefore, the present motion vector classification process is successful at reducing the overall computational complexity of MCFI.

TABLE 1

Percentage of blocks needing motion estimation.

| Sequence | Percentage |
| --- | --- |
| Foreman | 24.2% |
| Coastguard | 18.5% |
| Carphone | 27.1% |
| Mother | 3.0% |
| Salesman | 2.7% |
| Mobile | 63.0% |
| Clair | 2.0% |

Figure 5:
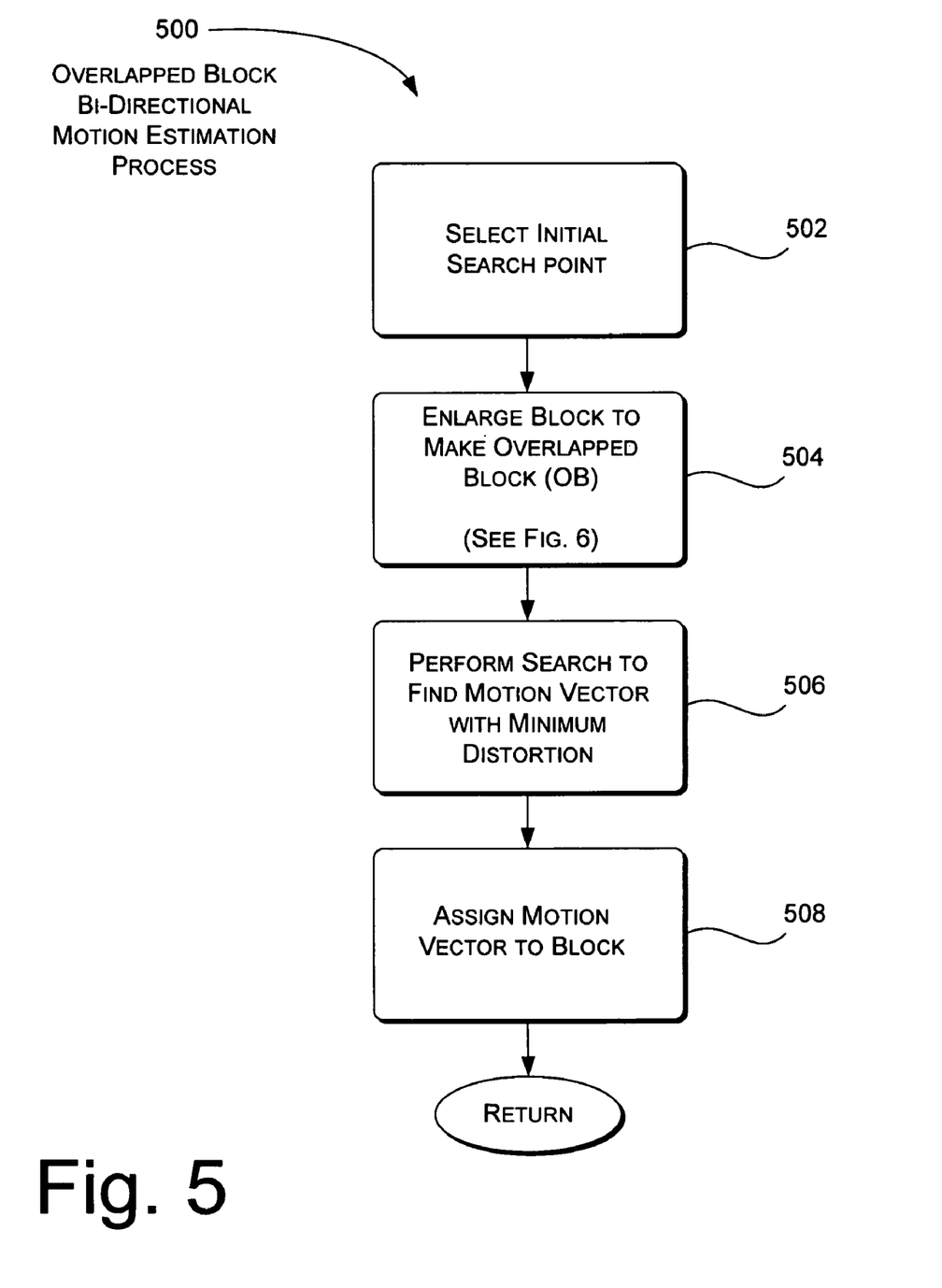
FIG. 5 is a flow diagram illustrating one implementation of an overlapped block bi-directional motion estimation process suitable for use in the low complexity MCFI process illustrated in FIG. 2.

FIG. 5 is a flow diagram illustrating one implementation of an overlapped block bi-directional motion estimation process 500 suitable for use in the low complexity MCFI process illustrated in FIG. 2. Process 500 is performed on each block having a motion vector that is classified as inaccurate. Processing begins at block 502, where an initial search point is selected. The initial search point is selected using well known techniques that examine the motion vectors of temporal and spatial neighboring blocks and selecting one with the minimal distortion as the initial search point. Processing continues at block 504.

Figure 6:
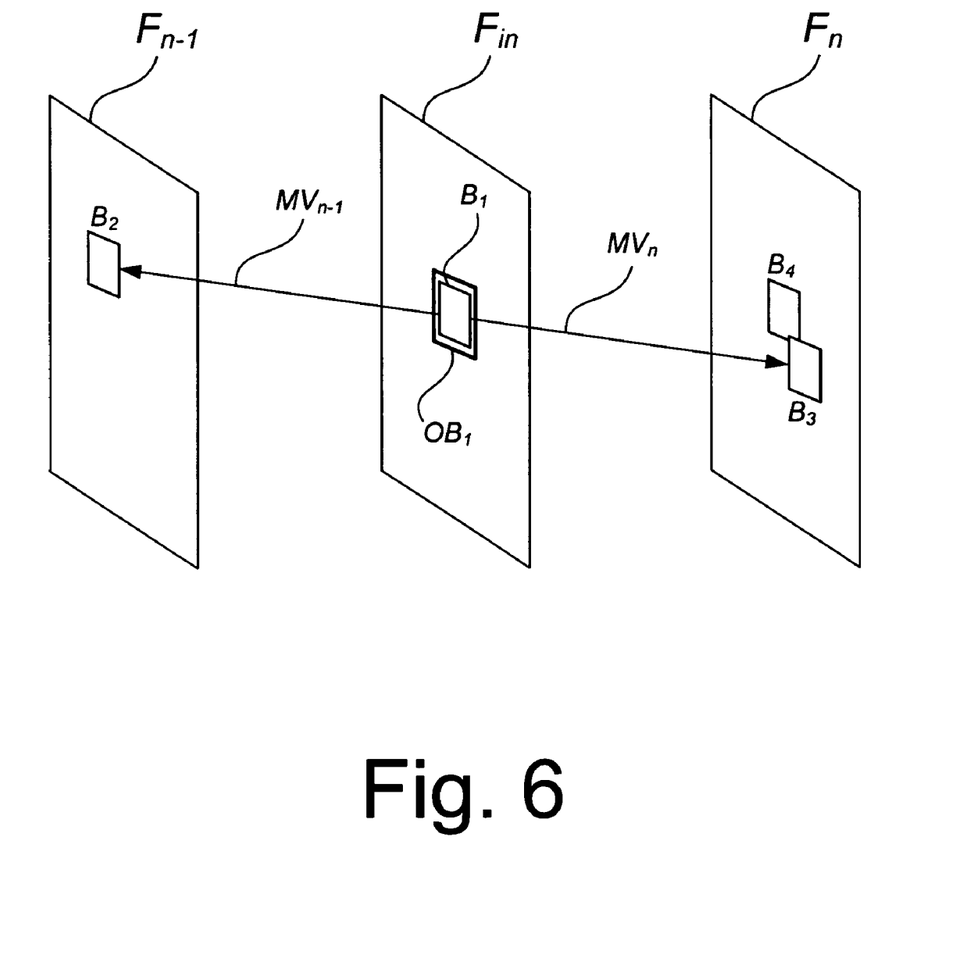
FIG. 6 is a graphical representation of an overlapped block used during the overlapped block bi-directional motion estimation process illustrated in FIG. 5.

At block 504, the block $B_1$ in the interpolated frame is enlarged to make an overlapped block ($OB_1$), as shown in FIG. 6. Overlapped block ($OB_1$) is used to avoid obtaining inaccurate motion vectors which is common when block sizes are small. When small blocks are used, it is common to have a motion search fail to reach the actual position because the SAD of the surrounding positions is larger than the current incorrect position. The motion search then erroneously chooses the current position. This is commonly referred to as a local minimum point. In one embodiment, the size of the overlapped block is 12×12, which provides a good tradeoff between accuracy and complexity. Processing continues at block 506.

At block 506, a search is performed to find a motion vector with the minimum distortion. The search performs a bi-directional motion estimation to find the motion vector mv=($mv_x$, $mv_y$) that minimizes the following equation:

$$D = \sum_{i=0}^{11} \sum_{j=0}^{11} \left| \left( \begin{array}{c} F_{n-1}(x_0 + mv_x + i, y_0 + mv_y + j) - \\ F_n(x_0 - mv_x + i, y_0 - mv_y + j) \end{array} \right) \right|. \quad \text{eq. (1)}$$

In equation one, ($x_0$, $y_0$) represents the coordinate of the top left point of the overlapped block (shown in FIG. 6) in the interpolated frame. In equation one, the absolute value of the difference between each pixel in the current frame and the previous frame determine the distortion (D). Because the motion vector is searched from the interpolated frame to the previous frame and from the interpolated frame to the current frame, the interpolated frame does not have holes or overlapped areas. Other techniques search for the motion vector from the current frame and position the block in the interpolated frame based on the obtained motion vector. Therefore, after each block is positioned in the interpolated frame, some of the blocks may overlap each other leaving holes in the interpolated frame. In addition, the bi-directional motion estimation may use any fast motion estimation technique to increase the speed of the search process. Processing continues at block 508.

At block 508, the motion vector that is obtained from equation 1 above is assigned as the motion vector for block $B_1$. Processing is then complete.

Figure 7:
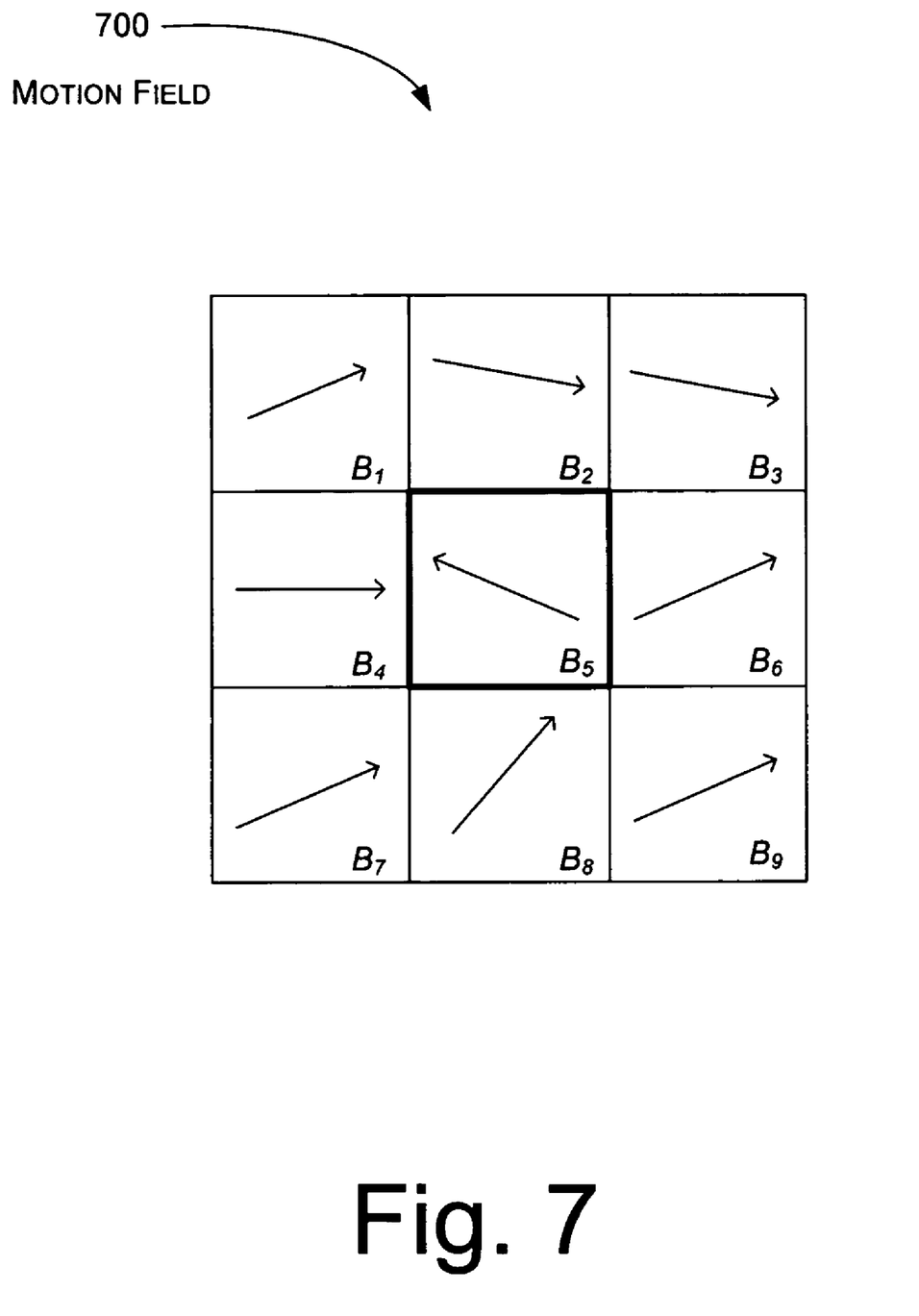
FIG. 7 is a graphical representation of a motion field used for illustrating vector smoothing performed in the low complexity MCFI process illustrated in FIG. 2.
Figure 8:
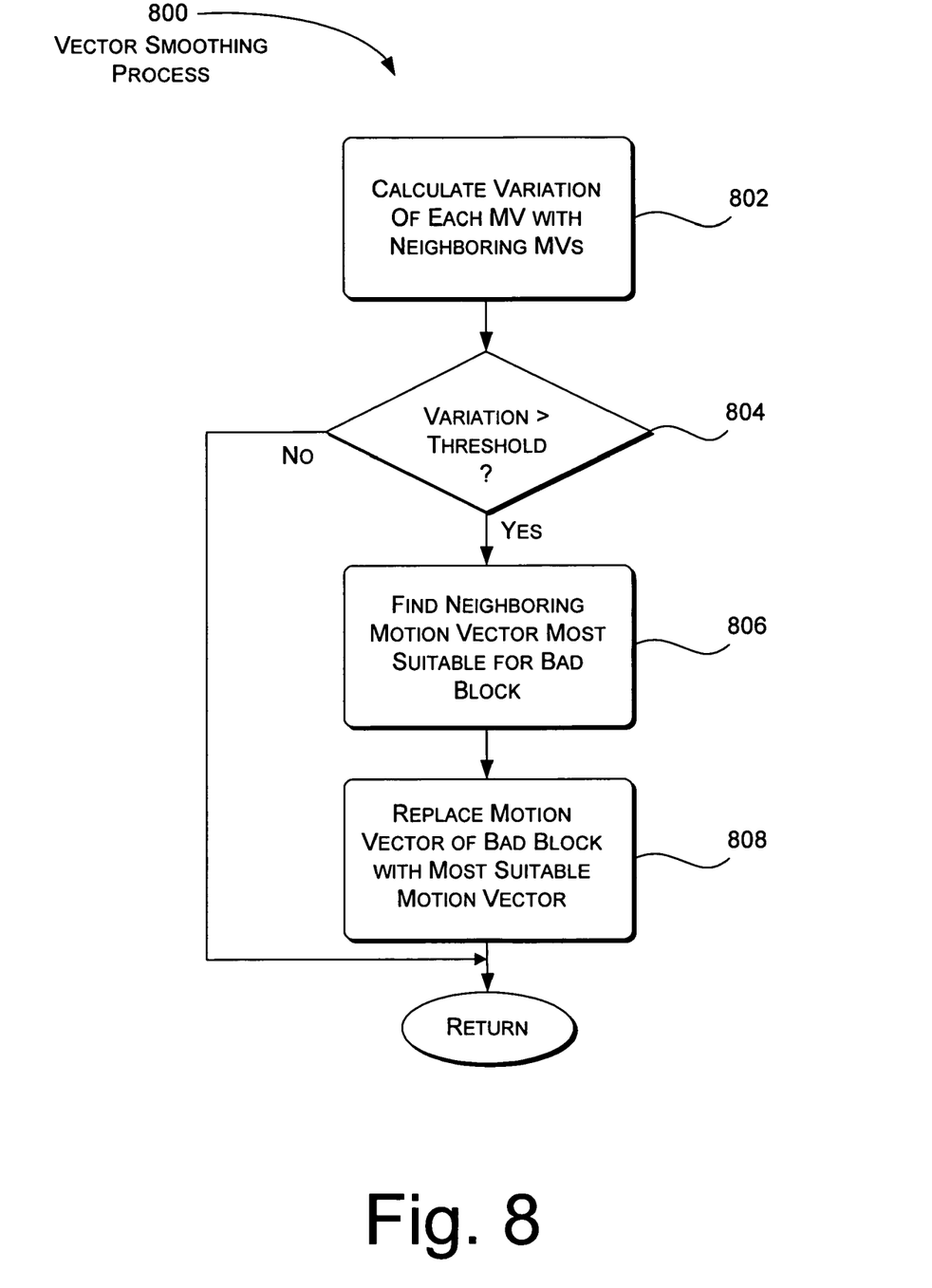
FIG. 8 is a flow diagram illustrating one implementation of a vector smoothing process suitable for use in the low complexity MCFI process illustrated in FIG. 2.

FIG. 7 is a graphical representation of a motion field used for illustrating vector smoothing in the low complexity MCFI process illustrated in FIG. 2. Even though each of the motion vectors has undergone the classification process, there still may be some motion vectors that will result in annoying artifacts and degrade video quality. During development of the present low complexity MCFI method, it was found that most artifacts originate from discontinuities in a motion field. FIG. 7 provides a graphical representation of a motion field 700 that will be used in describing these discontinuities. The motion field 700 includes a 3×3 array of blocks $B_1$-$B_9$. Each block has an associated motion vector. Each motion vector is designated by a line with an arrow at the end. The direction of the arrow represents the motion for the motion vector. Upon visually inspecting each motion vector, one will note that the motion vector for block $B_5$ is pointing in the opposite direction than the rest of the motion vectors. Thus, the motion vector for block $B_5$ represents a break in the continuity of motion field 700. Therefore, it is desirable to find a method that identifies motion vectors that break the continuity of the motion field. FIG. 8 illustrates one exemplary method.

FIG. 8 is a flow diagram illustrating one implementation of a vector smoothing process suitable for use in the low complexity MCFI process illustrated in FIG. 2. In overview, vector smoothing process 800 identifies motion vectors that break the continuity of a motion field and replaces the identified motion vector with a more suitable motion vector. Process 800 begins at block 802, where the variation of each motion vector with its neighboring motion vector is calculated. Processing continues at decision block 804.

At decision block 804, a determination is made whether the calculated variation exceeds a variation threshold. In one embodiment, the variation threshold may be 60. If it does not, the motion vector does not break the continuity of the motion field and processing is complete. Otherwise, the associated macro block is considered to be a bad block. Processing continues at block 806.

At block 806, a neighboring motion vector is found that is the most suitable for replacing the motion vector of the bad block. This may be performed using vector median filtering. Vector median filtering finds the one motion vector among neighboring motion vectors that minimizes the following equation:

$$\sum_{i=1}^{8} (|mv_x - mv_{x_i}| + |mv_y - mv_{y_i}|). \quad \text{eq. (2)}$$

The motion vectors of neighboring pixels are represented as ($mv_{xi}$, $mv_{yi}$). Processing continues at block 808.

At block 808, the motion vector that was found to minimize equation 2 is used to replace the bad motion vector. Processing is then complete.

Figure 9:
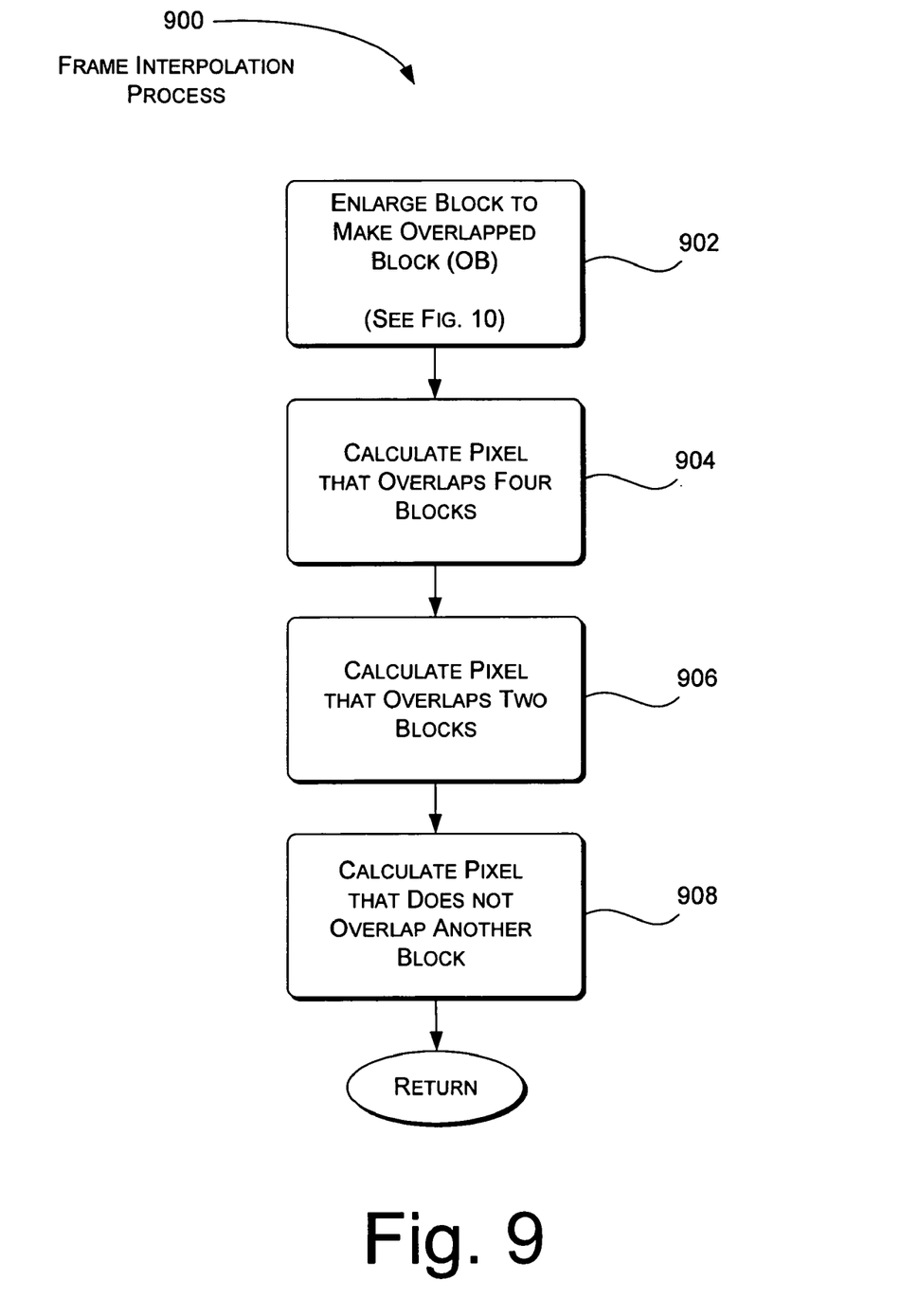
FIG. 9 is a flow diagram illustrating one implementation for a frame interpolation method suitable for use in the low complexity MCFI process illustrated in FIG. 2.

FIG. 9 is a flow diagram illustrating one implementation for a frame interpolation method suitable for use in the low complexity MCFI process illustrated in FIG. 2. Briefly, in order to interpolate the entire frame, overlapped block motion compensation is performed on each overlapped block. Regions of the overlapped block are processed based on the number of blocks the region overlaps. Processing begins at block 902, where the block is enlarged to create an overlapped block. Processing continues at block 904.

Figure 10:
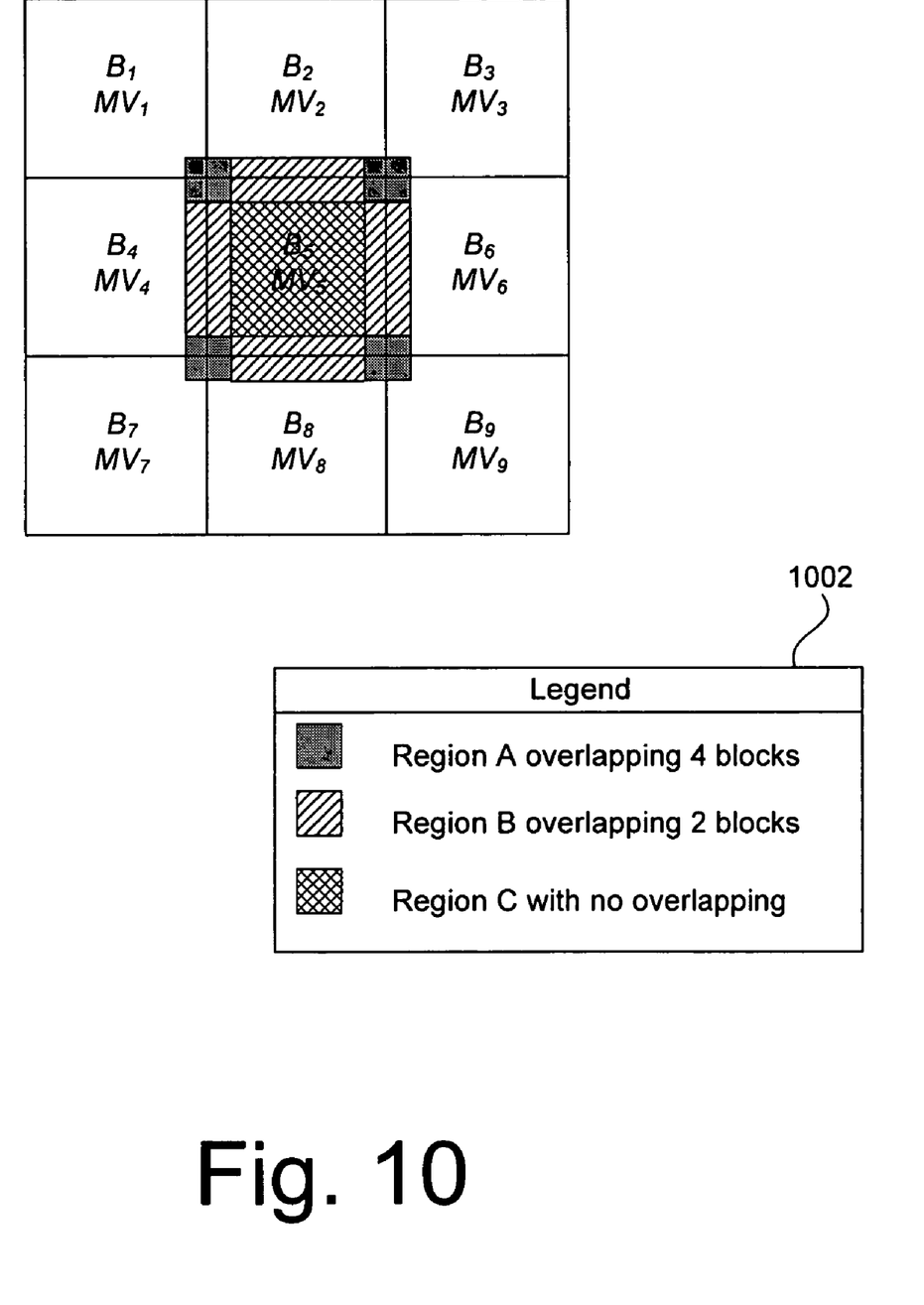
FIG. 10 is a graphical representation of neighboring blocks illustrating overlapping regions which are processed differently during the frame interpolation process illustrated in FIG. 9.

FIG. 10 is a graphical representation of neighboring blocks illustrating overlapping regions which are processed differently during the frame interpolation process. The neighboring blocks are the eight adjacent blocks ($B_1$-$B_4$ and $B_6$-$B_9$) to the block $B_5$. Each block has an associated motion vector ($MV_{1-9}$) that was determined from the embedded motion vectors, calculated in the overlapped block bi-directional motion estimation process illustrated in FIG. 5, or calculated in the vector smoothing process illustrated in FIG. 8. Each motion vector has an x- and y-component. For example, $MV_1$ may be represented as ($mv_{1x}$, $mv_{1y}$). Block $B_5$ is enlarged to form the overlapped block. The overlapped block has several regions. Region A represents the region which overlaps four blocks. Region B represents the region that overlaps two blocks. Region C represents the region that does not overlap any other blocks.

At block 904, the pixels within Region A are calculated based on the following equation:

$$F_{in}(x, y) = \left( \sum_{i=1}^{4} \left( \begin{array}{c} F_{n-1}(x + mv_{ix}, y + mv_{iy}) + \\ F_n(x - mv_{ix}, y - mv_{iy}) \end{array} \right) \right) / 8. \quad \text{eq. (3)}$$

In equation 3, the pixel value is determined by summing the pixel value in each of the overlapped regions in both the previous frame and current frame and dividing by eight to obtain the average value. The pixel values in the previous frame and the current frame depend on the motion vector of the corresponding block (i.e., $(mv_{ix}, mv_{iy})$). Processing continues at block 906.

At block 906, the pixels within Region B are calculated based on the following equation:

$$F_{in}(x, y) = \left( \sum_{i=3}^{4} \binom{F_{n-1}(x + mv_{ix}, y + mv_{iy}) +}{F_n(x - mv_{ix}, y - mv_{iy})} \right) \bigg/ 4. \qquad \text{eq. (4)}$$

In equation 4, the pixel value again is determined by summing the pixel value in each of the overlapped regions in both the previous frame and current frame and dividing by four to obtain the average value. The pixel values in the previous frame and the current frame depend on the motion vector of the corresponding block (i.e., $(mv_{ix}, mv_{iy})$). Processing continues at block 908.

At block 908, the pixels within Region C are calculated based on the following equation:

$$F_{in}(x,y)=(F_{n-1}(x+mv_x,y+mv_y)+F_n(x-mv_x,y-mv_y))/2. \qquad \text{eq. (5)}$$

In equation 5, the pixel value again is determined by summing the pixel value in both the previous frame and current frame and dividing by two to obtain the average value. The pixel values in the previous frame and the current frame depend on the motion vector of the corresponding block (i.e., $(mv_{ix}, mv_{iy})$). The process for interpolating the frame is then complete.

CONCLUSION

The present low complexity motion compensated frame interpolation method provides an efficient method for interpolating frames and eliminates many of the artifacts that appear in other motion compensated frame interpolation methods. The present low complexity MCFI significantly outperforms many of the other techniques, especially when the video sequences have moderate motion.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for interpolating frames, the method comprising:
    obtaining an embedded motion vector for each block within a current frame, the motion vector being embedded in a bitstream;
    for each block, classifying the associated embedded motion vector as an accurate motion vector or an inaccurate motion vector, the inaccurate motion vector designating the block as a bad block, wherein the classifying is based on determining whether a sum of absolute differences between a current block in a current frame and a previous block in a previous frame and a boundary absolute difference between the current block and the previous block meet a set of thresholds, wherein the current block and the previous block are determined based on an interpolated block and the embedded motion vector associated with a block in the current frame having the same position as the interpolated block within the interpolated frame;
    for each bad block, performing overlapped block bi-directional motion estimation on the bad block to obtain a new motion vector;
    assigning the new motion vector to the bad block; and
    generating an interpolated frame based on the new motion vector for the bad blocks and the embedded motion vector for the other blocks.

2. The method as recited in claim 1, wherein if the sum of absolute differences and the boundary absolute difference meet a first and second threshold, respectively, the embedded motion vector is classified as one of the accurate motion vectors.

3. The method as recited in claim 1, wherein if the sum of absolute difference meets a first threshold or the boundary absolute difference meets a second threshold, the embedded motion vector is classified as one of the accurate motion vectors.

4. The method as recited in claim 1, wherein classifying the associated embedded motion vector comprises:
    selecting the interpolated block in the interpolated frame, the interpolated block being positioned within the interpolated frame at a location;
    locating a block in the current frame, the block being positioned within the current frame at the same location;
    determining the previous block in the previous frame based on the interpolated block and the embedded motion vector associated with the block;
    determining the current block in the current frame based on the interpolated block and the embedded motion vector associated with the block;
    calculating the sum of absolute differences between the current block and the previous block; and
    calculating the boundary absolute difference between the current block and the previous block.

5. A method as recited in claim 4, further comprising assigning half of the embedded motion vector to the interpolated block if the embedded motion vector is classified as accurate.

6. The method as recited in claim 1, wherein generating the interpolated frame comprises:
    selecting a block within the interpolated frame;
    enlarging the block to make an overlapped block;
    dividing the overlapped block into a plurality of regions based on a number of blocks that the region overlaps; and
    calculating each pixel in each region based on motion vectors associated with the blocks within the region.

7. The method as recited in claim 6, wherein calculating each pixel comprises summing a pixel value in each of the overlapped blocks for both a previous frame and the current frame and dividing the sum by twice the number, wherein the pixel value in each block depends on the motion vector associated with that block.

8. The method as recited in claim 6, wherein the plurality of regions include a first region that overlaps four macrobocks, a second region that overlaps two blocks, and a third region that overlaps one block.

9. The method as recited in claim 1, further comprising performing vector smoothing on each block.

10. The method as recited in claim 9, wherein vector smoothing comprises:
    calculating a variation for each motion vector based on values of the motion vector and neighboring motion vectors;
    selecting the value of one of the neighboring motion vectors if the variation is not within a threshold; and replacing the value of the motion vector with the selected value.

11. A method as recited in claim 1, further comprising assigning half of the embedded motion vector to the interpolated block if the embedded motion vector is classified as accurate.

12. The method as recited in claim 1, wherein the block comprises an eight by eight pixel block and an overlapped block used in performing the block bi-directional motion estimation comprises a twelve by twelve pixel block.

13. A system for decoding video comprising:
a processor; and
a memory into which a plurality of computer-executable instructions are loaded, the plurality of instructions, when executed on the processor, directing the processor to perform operations comprising:
 obtaining an embedded motion vector for each block within a current frame, the motion vector being embedded in a bitstream;
 for each block, classifying the associated embedded motion vector as an accurate motion vector or an inaccurate motion vector, the inaccurate motion vector designating the block as a bad block, wherein classifying the associated embedded motion vector is based on determining whether a sum of absolute differences between a current block in a current frame and a previous block in a previous frame and a boundary absolute difference between the current block and the previous block meet a set of thresholds, wherein the current block and the previous block are determined based on an interpolated block and the embedded motion vector associated with a block in the current frame having the same position as the interpolated block within the interpolated frame;
 for each bad block, performing overlapped block bi-directional motion estimation on the bad block to obtain a new motion vector;
 assigning the new motion vector to the bad block; and
 generating an interpolated frame using the new motion vector for the bad blocks and the embedded motion vector for the other blocks.

14. The system as recited in claim 13, the operations further comprising:
calculating a variation for each motion vector based on values of the motion vector and neighboring motion vectors;
selecting the value of one of the neighboring motion vectors if the variation is not within a threshold; and
replacing the value of the motion vector with the selected value.

15. A method for interpolating frames, the method comprising:
 obtaining an embedded motion vector for each block within a current frame, the motion vector being embedded in a bitstream;
 for each block, classifying the associated embedded motion vector as an accurate motion vector or an inaccurate motion vector, the inaccurate motion vector designating the block as a bad block, wherein classifying the associated embedded motion vector includes:
  selecting an interpolated block in the interpolated frame, the interpolated block being positioned within the interpolated frame at a location;
  locating a block in the current frame, the block being positioned within the current frame at the same location;
  determining a previous block in a previous frame based on the interpolated block and the embedded motion vector associated with the block;
  determining a current block in the current frame based on the interpolated block and the embedded motion vector associated with the block;
  calculating a sum of absolute differences between the current block and the previous block; and
  calculating a boundary absolute difference between the current block and the previous block, wherein the classification of the embedded motion vector is based on the sum of absolute differences and the boundary absolute difference;
 for each bad block, performing overlapped block bi-directional motion estimation on the bad block to obtain a new motion vector;
 assigning the new motion vector to the bad block; and
 generating an interpolated frame based on the new motion vector for the bad blocks and the embedded motion vector for the other blocks.

16. A method as recited in claim 15, further comprising assigning half of the embedded motion vector to the interpolated block if the embedded motion vector is classified as accurate.

17. The method as recited in claim 15, wherein the block comprises an eight by eight pixel block and an overlapped block used in performing the block bi-directional motion estimation comprises a twelve by twelve pixel block.

* * * * *